(12) United States Patent
Noda et al.

(10) Patent No.: US 11,175,175 B2
(45) Date of Patent: Nov. 16, 2021

(54) DUAL TIRE DETERMINATION DEVICE AND DUAL TIRE DETERMINATION METHOD

(71) Applicant: Panasonic Intellectual Property Management Co., Ltd., Osaka (JP)

(72) Inventors: Akihiro Noda, Kanagawa (JP); Taro Imagawa, Osaka (JP); Hiroya Kusaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/812,246

(22) Filed: Mar. 6, 2020

(65) Prior Publication Data
US 2020/0209049 A1 Jul. 2, 2020

Related U.S. Application Data

(63) Continuation of application No. PCT/JP2018/019221, filed on May 18, 2018.

(30) Foreign Application Priority Data

Oct. 31, 2017 (JP) .............................. JP2017-211342

(51) Int. Cl.
*G01G 19/02* (2006.01)
*G06T 7/62* (2017.01)

(52) U.S. Cl.
CPC .............. *G01G 19/022* (2013.01); *G06T 7/62* (2017.01); *G06T 2207/30236* (2013.01)

(58) Field of Classification Search
CPC . G08G 1/015; G06T 7/00; G06T 7/62; G01G 19/022
See application file for complete search history.

(56) References Cited

FOREIGN PATENT DOCUMENTS

| JP | 2012-198699 | * 10/2012 | ............. G08G 1/015 |
|---|---|---|---|
| JP | 2016-170598 | * 9/2016 | ............... G06T 7/00 |

OTHER PUBLICATIONS

International Search Report of PCT application No. PCT/JP2018/019221 dated Aug. 14, 2018.

\* cited by examiner

*Primary Examiner* — Myron Wyche
(74) *Attorney, Agent, or Firm* — McDermott Will & Emery LLP

(57) ABSTRACT

A double tire determination device includes an image input unit and a determination unit. The image input unit receives input of a captured image including a tire mounted on a vehicle. The determination unit determines whether the tire is a double tire, based on a ratio between a first area and a second area. The first area is an area of a first wheel region that is a part of a region of a wheel holding the tire and that is located on a side in a first direction with respect to a position of a rotation center of the tire. The second area is an area of a second wheel region that is a part of the region of the wheel holding the tire and that is located on a side in a second direction, which is opposite to the first direction, with respect to the position of the rotation center.

8 Claims, 10 Drawing Sheets

FIG. 10A

Coefficient α1

| Y \ X | Range 1 (1 to 10 pixels) | Range 2 (11 to 20 pixels) | Range 3 (21 to 30 pixels) | ... |
|---|---|---|---|---|
| Range 1 (1 to 10 pixels) | 5 | 4.5 | 5 | ... |
| Range 2 (11 to 20 pixels) | 6 | 5 | 5 | ... |
| Range 3 (21 to 30 pixels) | 4 | 4 | 4 | ... |
| ⋮ | ⋮ | ⋮ | ⋮ | ⋮ |

FIG. 10B

Coefficient α2

| Y \ X | Range 1 (1 to 10 pixels) | Range 2 (11 to 20 pixels) | Range 3 (21 to 30 pixels) | ... |
|---|---|---|---|---|
| Range 1 (1 to 10 pixels) | 7.5 | 7 | 7.5 | ... |
| Range 2 (11 to 20 pixels) | 9 | 7.5 | 7.5 | ... |
| Range 3 (21 to 30 pixels) | 6 | 6 | 6 | ... |
| ⋮ | ⋮ | ⋮ | ⋮ | ⋮ |

DUAL TIRE DETERMINATION DEVICE AND DUAL TIRE DETERMINATION METHOD

TECHNICAL FIELD

The present disclosure relates to a double tire determination device that determines whether a tire mounted on a vehicle is a double tire.

BACKGROUND ART

A conventional double tire determination device is known, in which it is determined whether a tire mounted on a vehicle is a double tire.

The expression "double tire" represents a mounting state of tires and specifically represents a mounting state of tires where two wheels are arranged parallel to each other on one side of an axle and where two tires with the same size are used for the two wheels.

For example, PTL 1 describes a technique, in which detection light is applied to a wheel holding a target tire, and based on a detection result of reflected light caused by reflection of the detection light by the wheel, it is determined whether the tire is a double tire.

CITATION LIST

Patent Literature

PTL 1: Unexamined Japanese Patent Publication 2016-170598

SUMMARY

To use the above conventional technique, intensity of the reflected light needs to be significantly higher than ambient light at a use place where the technique is used.

For this reason, the conventional double tire determination device using the above conventional technique has sometimes a limitation in a place of installation and an operation time slot of the double tire determination device.

The present disclosure has been made in view of the above issues, and an object of the present disclosure is to provide a double tire determination device that determines, without applying detection light to a target tire or detecting reflected light of the detection light, whether the tire is a double tire.

A double tire determination device according to an aspect of the present disclosure includes an image input unit and a determination unit. The image input unit receives input of a captured image including a tire mounted on a vehicle. The determination unit determines from the captured image whether the tire is a double tire. The determination unit determines whether the tire is a double tire, based on a ratio between a first area and a second area. The first area is an area of a first wheel region that is a part of a region of a wheel holding the tire and that is located on a side in a first direction with respect to a position of a rotation center of the tire in the captured image. The second area is an area of a second wheel region that is a part of the region of the wheel holding the tire and that is located on a side in a second direction, which is opposite to the first direction, with respect to the position of the rotation center.

A double tire determination method according to an aspect of the present disclosure includes receiving input of a captured image including a tire mounted on a vehicle, and determining from the captured image whether the tire is a double tire. In the determining, the double tire determination method further includes determining whether the tire is a double tire, based on a ratio between a first area and a second area. The first area is an area of a first wheel region that is a part of a region of a wheel holding the tire and that is located on a side in a first direction with respect to a position of a rotation center of the tire in the captured image. The second area is an area of a second wheel region that is a part of the region of the wheel holding the tire and that is located on a side in a second direction, which is opposite to the first direction, with respect to the position of the rotation center.

The above double tire determination device and double tire determination method make it possible to determine, without applying detection light to a target tire or detecting reflected light of the detection light, whether the tire is a double tire.

BRIEF DESCRIPTION OF DRAWINGS

FIG. 10A is a data configuration table of a displacement coefficient $\alpha 1$.

FIG. 10B is a data configuration table of a displacement coefficient $\alpha 2$.

DESCRIPTION OF EMBODIMENT

Figure 1:
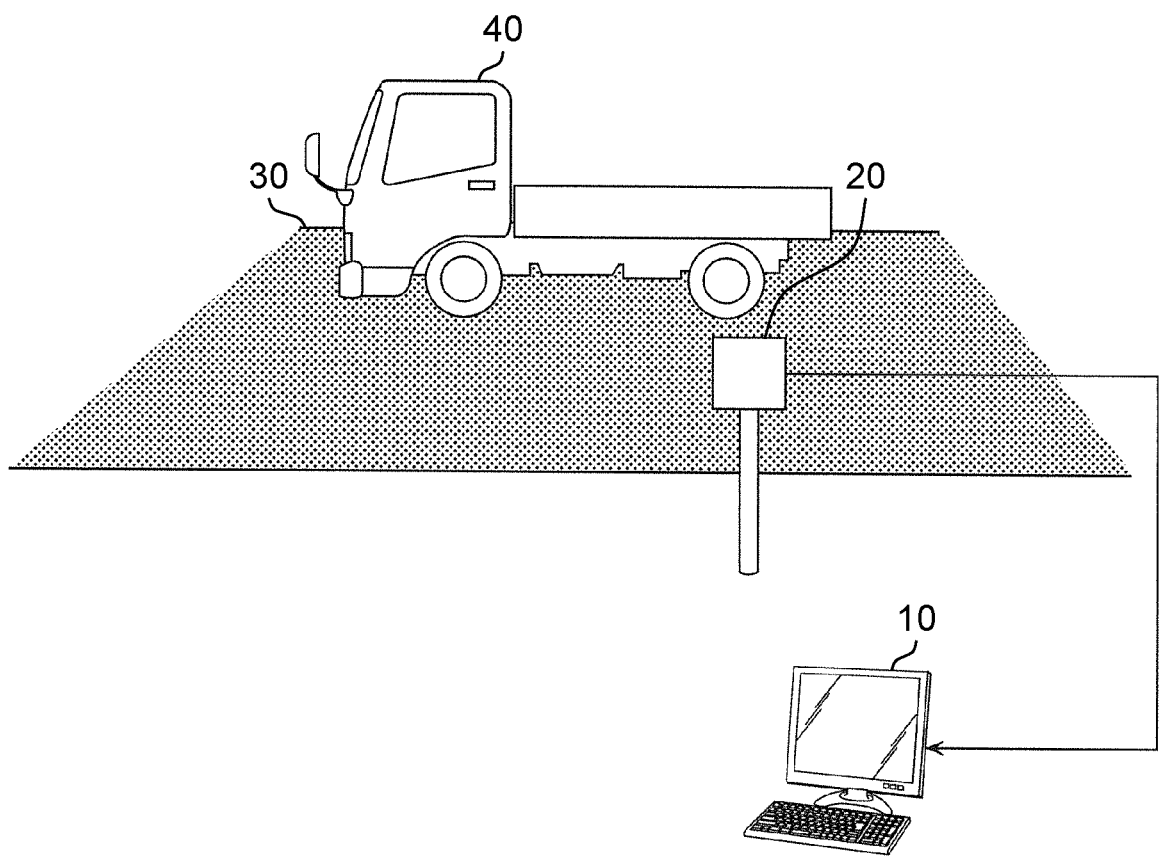
FIG. 1 is a schematic diagram showing an example of when it is determined whether the tire is a double tire.

A double tire determination device according to an aspect of an exemplary embodiment includes an image input unit and a determination unit. The image input unit receives input of a captured image including a tire mounted on a vehicle. The determination unit determines from the captured image whether the tire is a double tire. The determination unit determines whether the tire is a double tire, based on a ratio between an area, in the captured image, of a first wheel region that is a part of a region of a wheel holding the tire and that is located on a side in a first direction with respect to a position of a rotation center of the tire and an area, in the captured image, of a second wheel region that is a part of the region of the wheel holding the tire and that is located on a side in a second direction, which is opposite to the first direction, with respect to the position of the rotation center.

This double tire determination device determines, from a captured image including a target tire, whether the tire is a double tire.

Therefore, this double tire determination device makes it possible to determine, without applying detection light to a target tire or detecting reflected light of the detection light, whether the tire is a double tire.

A double tire determination method according to an aspect of an exemplary embodiment includes an input step of receiving input of a captured image including a tire mounted on a vehicle, and a determination step of determining from the captured image whether the tire is a double tire. In the determination step, it is determined whether the tire is a double tire, based on a ratio between an area, in the captured image, of a first wheel region that is a part of a region of a wheel holding the tire and that is located on a side in a first direction with respect to a position of a rotation center of the tire and an area, in the captured image, of a second wheel region that is a part of the region of the wheel holding the tire and that is located on a side in a second direction, which is opposite to the first direction, with respect to the position of the rotation center.

This double tire determination method determines, from a captured image including a target tire, whether the tire is a double tire.

Therefore, this double tire determination method makes it possible to determine, without applying detection light to a target tire or detecting reflected light of the detection light, whether the tire is a double tire.

Note that these generic or specific aspects may be implemented by using a system, a method, an integrated circuit, a computer program, or a computer-readable recording medium such as a compact disc read only memory (CD-ROM), and may also be implemented by any combination of a system, a method, an integrated circuit, a computer program, or a recording medium.

Hereinafter, specific examples of a double tire determination device according to an aspect of the present disclosure will be described. Note that each of the exemplary embodiments to be described below illustrates one preferred specific example of the present disclosure. Numerical values, shapes, materials, components, arrangement positions and connection configurations of the components, steps, processing order of the steps, and the like shown in the following exemplary embodiments are just an example, and are not intended to limit the present disclosure. The present disclosure is limited only by the scope of the claims. Therefore, among the components in the following exemplary embodiments, components not described in any of independent claims indicating the most generic concept of the present disclosure are not essential for achieving the object of the present disclosure but are described as components constituting a further preferable configuration.

First Exemplary Embodiment

In this exemplary embodiment, a double tire determination device will be described as an aspect of the present disclosure, and the double tire determination device determines whether a tire on a vehicle on a traveling road for vehicles is a double tire.

To this double tire determination device, a captured image taken of a certain traveling road is input from an external image capturing device. Then, the double tire determination device determines, from the captured image having been input, whether a tire mounted on the vehicle is a double tire.

Hereinafter, the double tire determination device will be described in detail with reference to the drawings.

1-1. Configuration

FIG. 1 is a schematic diagram showing an example of how double tire determination device 10 according to the first exemplary embodiment is used to determine whether a tire mounted on vehicle 40 is a double tire.

In this exemplary embodiment, double tire determination device 10 is connected to image capturing device 20 that takes an image of traveling road 30 such as an asphalt road where a large vehicle 40 such as a track is traveling. To double tire determination device 10, one or more captured images taken by image capturing device 20 are input.

Figure 2:
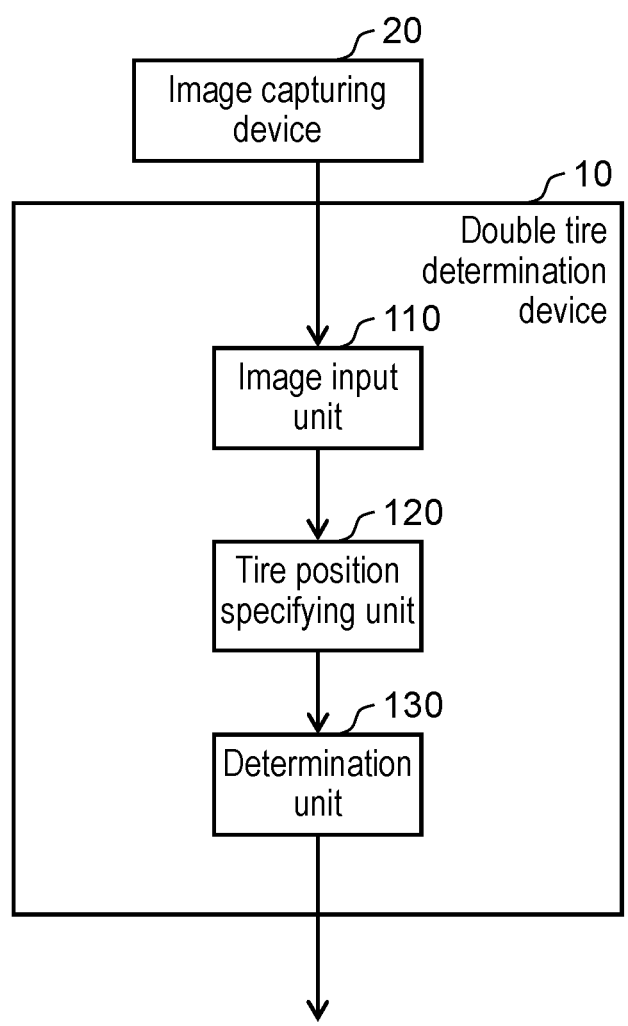
FIG. 2 is a block diagram showing a configuration of a double tire determination device according to a first exemplary embodiment.

FIG. 2 is a block diagram showing a configuration of double tire determination device 10. As shown in FIG. 2, double tire determination device 10 is configured to include image input unit 110, tire position specifying unit 120, and determination unit 130.

Double tire determination device 10 is implemented, for example, such that, in a computer (not shown) including a microprocessor (not shown) and a memory (not shown), the microprocessor executes a program stored in the memory.

Image input unit 110 receives input of one or more captured images taken by image capturing device 20. In this case, for example, image input unit 110 receives input of a digital image of 4096×2160 pixels. The captured image is input through communication by radio or wire or through a recording medium.

If the captured image received by image input unit 110 includes a tire mounted on a vehicle, tire position specifying unit 120 specifies a position of the tire in the captured image. In this exemplary embodiment, tire position specifying unit 120 specifies, for example, a rotation center of the tire in the captured image as a position of the tire.

More specifically, tire position specifying unit 120 performs image recognition processing on the captured image to determine whether the captured image includes a vehicle. Then, if a vehicle is determined to be included, tire position specifying unit 120 further performs image recognition processing to recognize the tire on the vehicle and specifies a rotation center of the tire as a position of the tire. Tire position specifying unit 120 may specify, for example, a shaft center of an axle supporting a wheel holding the tire as the rotation center of the tire.

Determination unit 130 determines whether the tire is a double tire, based on the captured image received by include image input unit 110 and the position of the tire, in the captured image, specified by tire position specifying unit 120.

With reference to the drawing, it will be described below how determination unit 130 determines whether a target tire is a double tire.

Figure 3A:
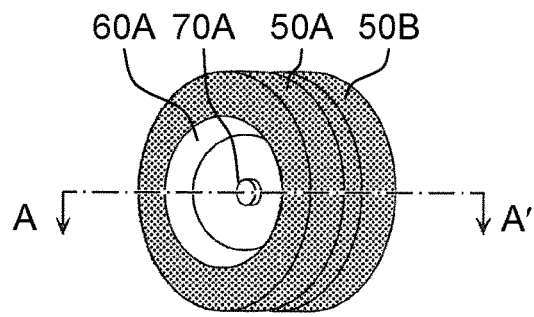
FIG. 3A is a perspective view of a double tire.
Figure 3B:
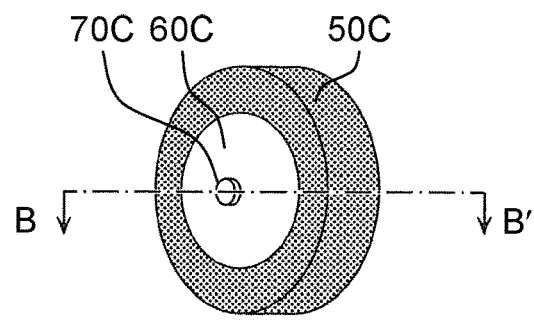
FIG. 3B is a perspective view of a single tire.

FIG. 3A is a perspective view of a double tire, and FIG. 3B is a perspective view of a single tire. In this exemplary embodiment, the expression "double tire" refers to a mounting state of tire where two tires with the same size are used on one side of an axle. The expression "single tire" refers to a mounting state of tire where one tire is used on one side of an axle.

Figure 4A:
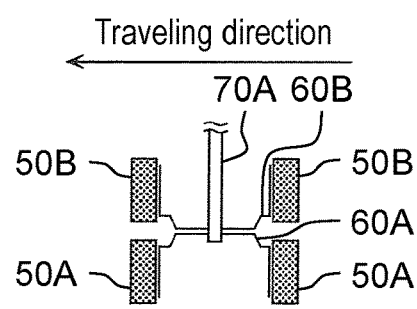
FIG. 4A is a cross-sectional view of a double tire.
Figure 4B:
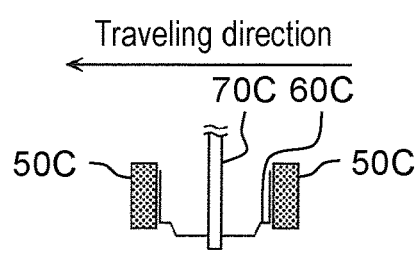
FIG. 4B is a cross-sectional view of a single tire.

FIG. 4A is a cross-sectional view of the double tire along plane A-A' in FIG. 3A, FIG. 4B is a cross-sectional view of the single tire along plane B-B' in FIG. 3B.

As shown in FIGS. 3A and 4A, in the case of the double tire, two wheels 60A and 60B are parallelly arrange on one side of axle 70A, and two tires 50A and 50B with the same size are used.

On the other hand, in the case of the single tire, as shown in FIGS. 3B and 4B, one tire 50C is used on one side of axle 70C.

In general, in the case of the double tire, as shown in FIGS. 3A and 4A, wheel 60A holding tire 50A located on the outer side is disposed to be concave toward the inner side of axle 70A.

In contrast, generally in the case of the single tire, as shown in FIGS. 3B and 4B, wheel 60C holding tire 50C is disposed to be convex to the outer side of axle 70C.

Figure 5:
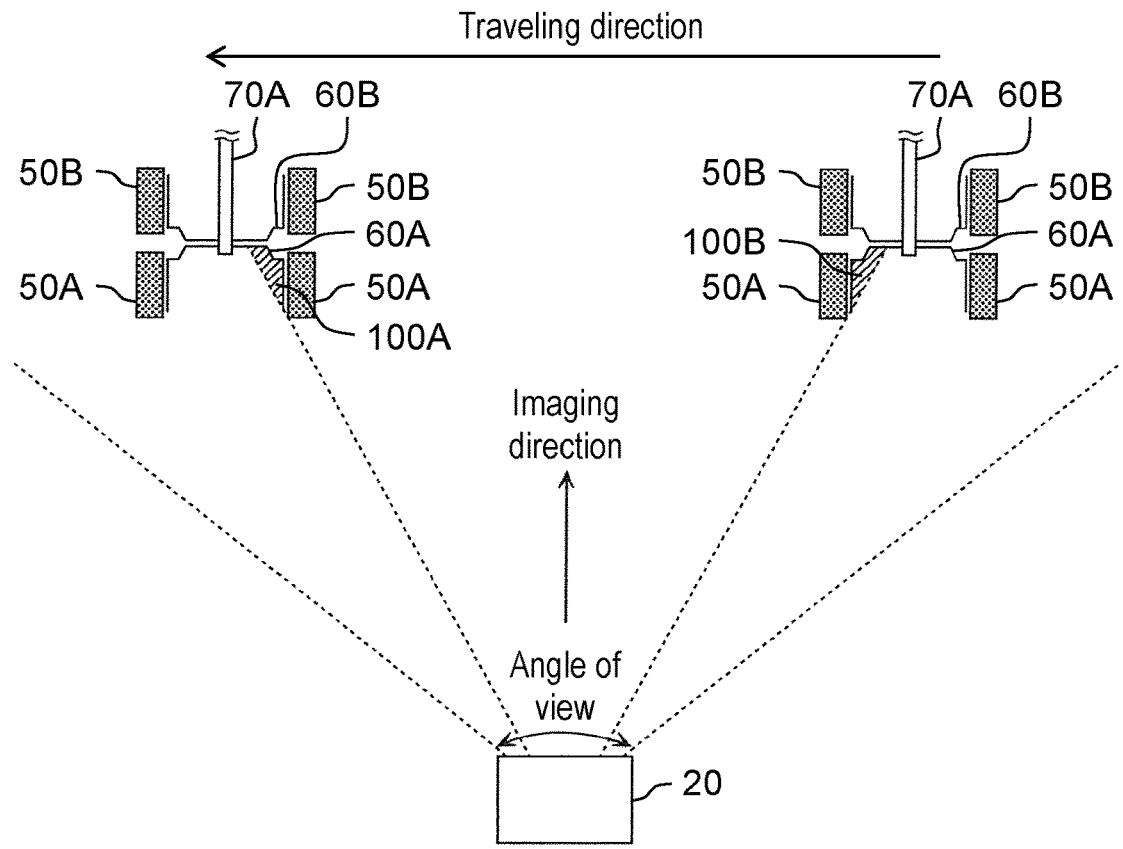
FIG. 5 is a schematic diagram showing an example of when a double tire imaged.
Figure 6:
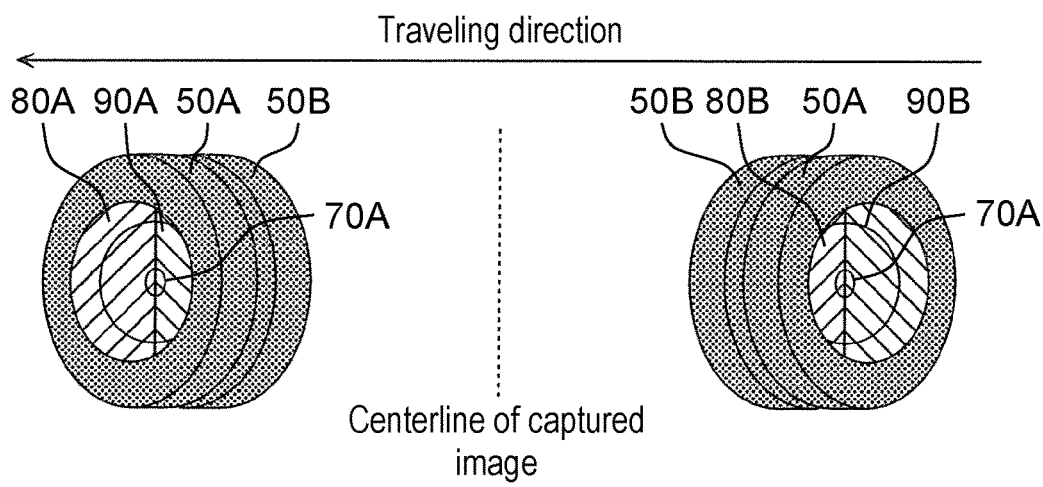
FIG. 6 is a diagram showing an example of a captured image.
Figure 7:
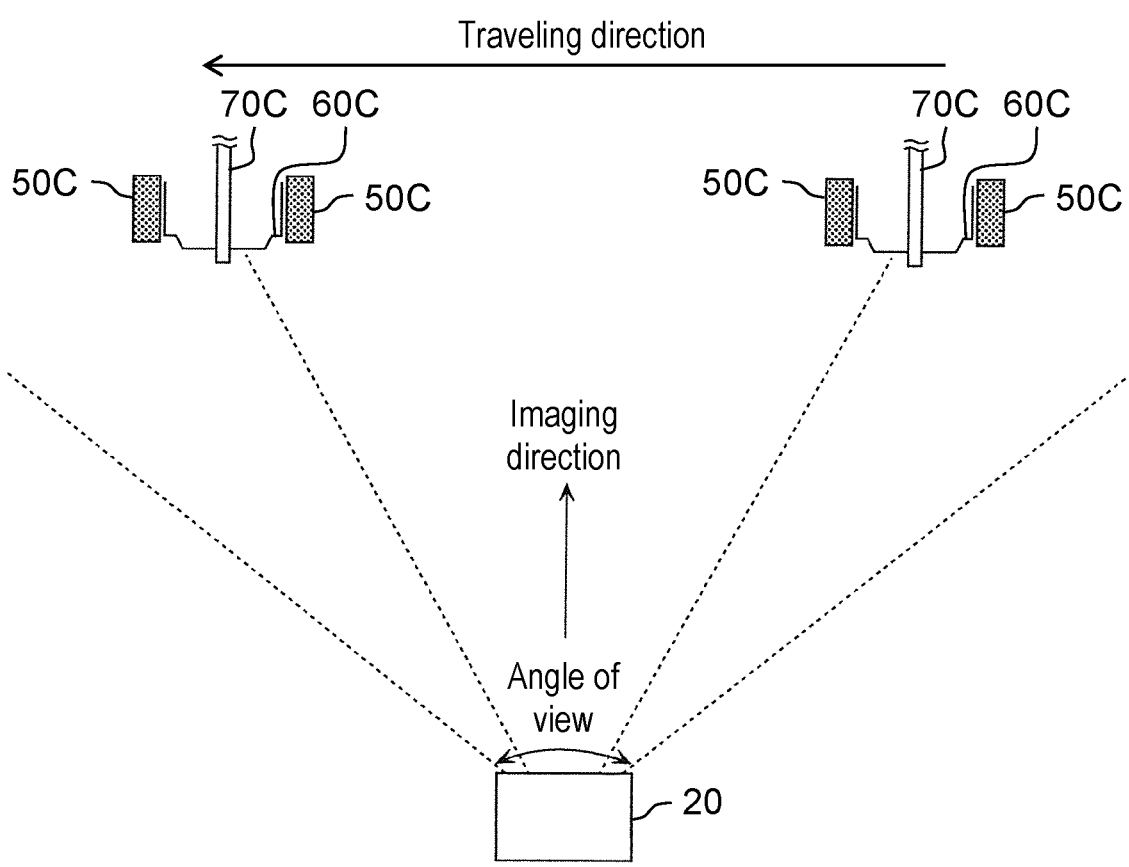
FIG. 7 is a schematic diagram showing an example of when a single tire is imaged.

FIG. 5 is a schematic diagram showing an example of when image capturing device 20 takes an image of a double tire. FIG. 6 is a diagram showing an example of a captured image taken by image capturing device 20. FIG. 7 is a schematic diagram showing when image capturing device 20 takes an image of a single tire.

As shown in FIG. 5, when the double tire is located on the forward side in a traveling direction of the vehicle with respect to an imaging direction of image capturing device 20, a partial region, of wheel 60A, on the backward side in the traveling direction is hidden in blind spot 100A of tire 50A and thus cannot be viewed from image capturing device 20 because wheel 60A is disposed to be concave toward the inner side of axle 70A.

Therefore, as shown in FIG. 6, when the double tire is located on the forward side in the traveling direction of the vehicle with respect to a center of the captured image as shown in FIG. 6, an area of first wheel region 80A is larger than an area of second wheel region 90A. Note that first wheel region 80A is a region, of wheel 60A, located on the forward side in the traveling direction of the vehicle with respect to the rotation center of tire 50A (the shaft center of axle 70A, in this case). Further, second wheel region 90A is a region, of wheel 60A, located on the backward side in the traveling direction of the vehicle with respect to the rotation center of tire 50A. In this case, a center of a rotation axis may be extracted from shapes of wheel 60A and axle 70A or may be extracted from rotational components of tire 50A and wheel 60A in the captured image.

Further, as shown in FIG. 5, when the double tire is located on the backward side in the traveling direction of the vehicle with respect to the imaging direction of image capturing device 20, the partial region, of wheel 60A, on the forward side in the traveling direction is hidden in blind spot 100B of tire 50A and thus cannot be viewed from image capturing device 20 because wheel 60A is disposed to be concave toward the inner side of axle 70A.

Therefore, as shown in FIG. 6, when the double tire is located on the backward side in the traveling direction of the vehicle with respect to the center of the captured image, an area of second wheel region 90B is larger than an area of first wheel region 80B. Note that second wheel region 90B is a region, of wheel 60A, located on the backward side in the traveling direction of the vehicle with respect to the rotation center of tire 50A. First wheel region 80B is a region, of wheel 60A, located on the forward side in the traveling direction of the vehicle with respect to the rotation center of tire 50A.

On the other hand, as shown in FIG. 7, in a case where the tire to be imaged is a single tire, wheel 60C is hardly hidden in a blind spot of tire 50C because wheel 60C is disposed to be convex toward the outer side of axle 70.

As described with reference to FIGS. 5 to 7, in the case where the target tire is a double tire, part of wheel 60A is hidden in the blind spot of tire 50A, depending on the position of the tire in the captured image. Thus, it happens sometime that a ratio between the area (first area) of the first wheel region (first wheel region 80A or first wheel region 80B in FIG. 6) and the area (second area) of the second wheel region (second wheel region 90A or second wheel region 90B in FIG. 6) is not equal to 1:1.

Determination unit 130 uses this phenomenon to determine, based on the blind spot, which is caused by tire 50A, on wheel 60A of tire 50A in the captured image, whether the target tire is a double tire. Specifically, determination unit 130 makes the above determination based on the ratio between the area of the first wheel region (first wheel region 80A or first wheel region 80B in this case) and the area of the second wheel region (second wheel region 90A or second wheel region 90B in this case). In this embodiment, the first wheel region is a region in the captured image and is a part, of wheel 60A for tire 50A, located on the side in the first direction (the forward direction in the traveling direction of the vehicle, in this case) with respect to the position of the rotation center of tire 50A. Further, the second wheel region is a region in the captured image and is a part of, wheel 60A for tire 50A, located on the side in the second direction (the backward direction in the traveling direction of the vehicle, in this case), which is opposite to the first direction, with respect to the position of the rotation center of tire 50A.

More specifically, in the case where the position of tire 50A, in the captured image, specified by tire position specifying unit 120 is displaced on the first direction side with respect to the central position of the captured image by greater than or equal to a first predetermined length, if the area of first wheel region 80 is larger than the area of second wheel region 90, determination unit 130 determines that the target tire is a double tire. Further, in the case where the position of tire 50A, in the captured image, specified by tire position specifying unit 120 is displaced on the second direction side with respect to the central position of the captured image by greater than or equal to a second predetermined length, if the area of the second wheel region 90 is greater than the area of first wheel region 80, determination unit 130 determines that the target tire is a double tire.

Further, a direction of a perpendicular line from the position of image capturing device 20 to an extended line of the rotation axis of tire 50A (axle 70A) may be defined as the first direction, and the direction opposite to the perpendicular line may be defined as the second direction. That is, by an image being taken by image capturing device 20 from a direction different from the direction of the extended line of the rotation axis, it is possible to determine based on the blind spot due to tire 50A whether the target tire is a double tire.

Here, the first predetermined length may be any value as long as the area of first wheel region 80 is significantly larger than the area of second wheel region 90 in the case where the position of tire 50A, in the captured image, specified by tire position specifying unit 120 is displaced on the first direction side with respect to the central position of the captured image, if the area of the second wheel region 90 is greater than or equal to the area of first wheel region 80. Further, the second predetermined length may be any value as long as the area of second wheel region 90 is significantly larger than the area of first wheel region 80 in the case where the position of tire 50A, in the captured image, specified by tire position specifying unit 120 is displaced on the second direction side with respect to the central position of the captured image, if the area of the second wheel region 90 is greater than or equal to the area of first wheel region 80. Each of the first predetermined length and the second predetermined length may be, for example, a value defined by a length in the real space (1*m*, for example) corresponding to a captured image or may be, for example, a value defined by a pixel number on a captured image (100 pixels, for example). Further, the first predetermined length and the second predetermined length may be, for example, the same value or may be, for example, a different value from each other.

An operation performed by double tire determination device 10 having the above configuration will be described below with reference to the drawing.

1-2. Operation

Double tire determination device 10 performs a double tire determination process as its characteristic operation.

The double tire determination process is a process that determines, when a captured image including a tire mounted on a vehicle is input, whether the tire is a double tire.

Figure 8:
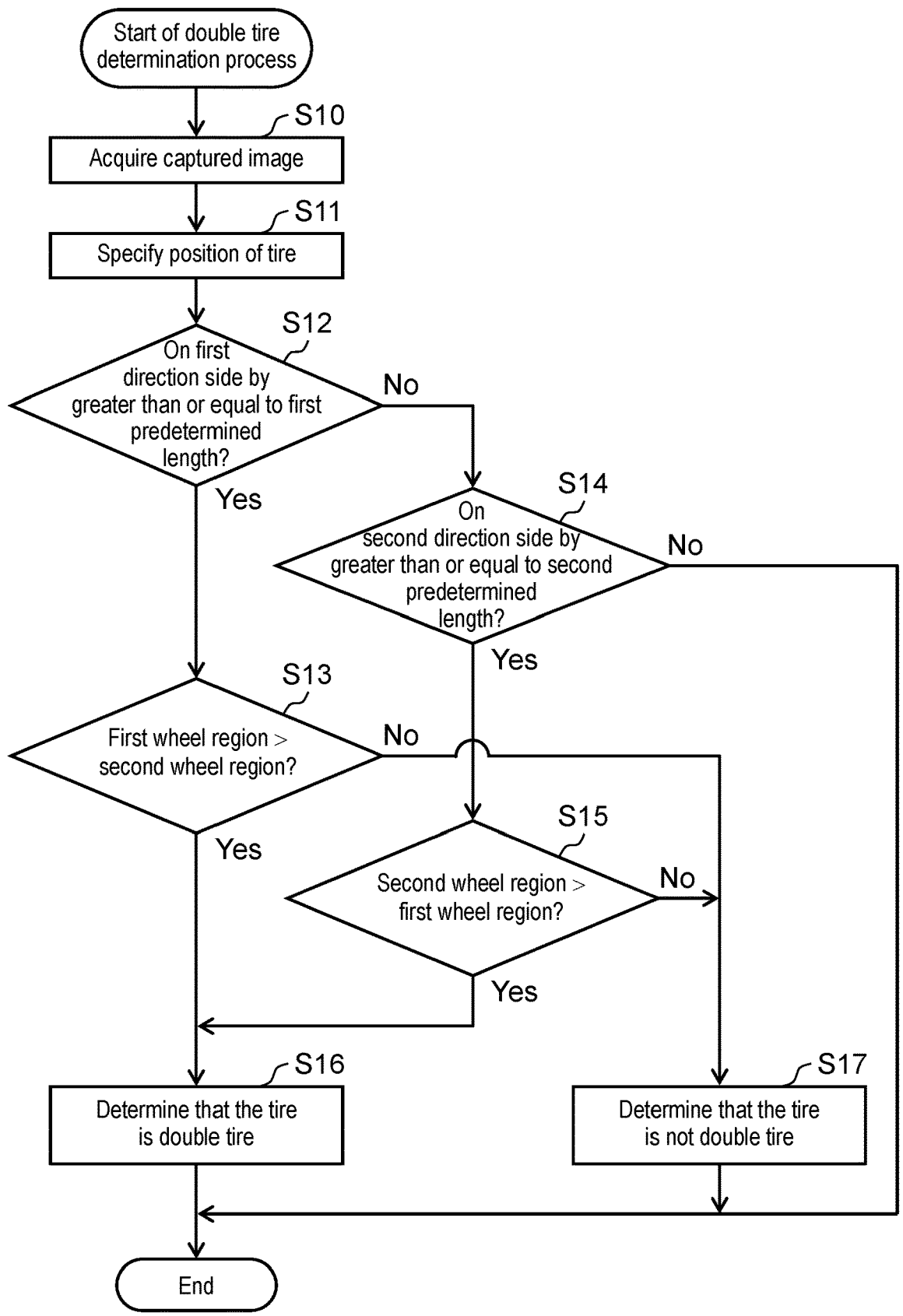
FIG. 8 is a flowchart of a double tire determination process.

FIG. 8 is a flowchart of the double tire determination process.

The double tire determination process is started when a captured image including a tire mounted on a vehicle is input to image input unit 110.

When the double tire determination process is started, image input unit 110 acquires the captured image having been input (step S10).

When the captured image is acquired, tire position specifying unit 120 performs image processing to calculate a coordinate of the rotation center of the tire included in the captured image and specifies the calculated coordinate as the position of the tire (step S11).

When the position of the tire is specified, determination unit 130 checks whether the specified position of the tire is displaced on the forward side in the traveling direction of the vehicle (on the side in the first direction) wearing the tire with respect to the central position of the captured image by greater than or equal to the first predetermined length (step S12).

In the process of step S12, if the specified position of the tire is displaced on the first direction side with respect to the central position of the captured image by greater than or equal to the first predetermined length (step S12: Yes), determination unit 130 compares the area of the first wheel region and the area of the second wheel region (step S13). Here, the first wheel region is a region in the captured image and is a part, of the region of the wheel holding the tire, located on the first direction side with respect to the rotation center of the tire. Further, the second wheel region is a region in the captured image and is a part, of the region of the wheel holding the tire, located on the second direction side with respect to the rotation center of the tire.

In the process of step S12, if the specified position of the tire is not displaced on the first direction side with respect to the central position of the captured image by greater than or equal to the first predetermined length (step S12: No), determination unit 130 checks whether the position of the tire is displaced on the backward side in the traveling direction (on the side in the second direction) of the vehicle wearing the tire by greater than or equal to the second predetermined length (step S14).

In the process of step S14, if the specified position of the tire is displaced on the second direction side with respect to the central position of the captured image by greater than or equal to the second predetermined length (step S14: Yes), determination unit 130 compares the area of the first wheel region in the captured image and the area of the second wheel region in the captured image (step S15).

In the process of step S13, if the area of the first wheel region is larger than the area of the second wheel region (step S13: Yes), determination unit 130 determines that the target tire is a double tire (step S16). Further, in the process of step S15, if the area of the second wheel region is larger than the area of the first wheel region (step S15: Yes), determination unit 130 determines that the target tire is a double tire (step S16).

In the process of step S13, if the area of the first wheel region is not larger than the area of the second wheel region (step S13: No), determination unit 130 determines that the target tire is not a double tire (step S17). Further, in the process of step S15, if the area of the second wheel region is not larger than the area of the first wheel region (step S15: No), determination unit 130 determines that the target tire is not a double tire (step S17).

Double tire determination device 10 finishes the double tire determination process in any one of the following cases: when the process of step S16 is finished; when the process of step S17 is finished; and when the specified position of the tire is not on the second direction side with respect to the central position of the captured image by greater than or equal to the second predetermined length in the process of step S14 (step S14: No).

1-3. Advantageous Effects and the Like

As described above, double tire determination device 10 determines, from a captured image including a target tire, whether the tire is a double tire.

Therefore, this double tire determination device 10 makes it possible to determine, without applying detection light to a target tire or detecting reflected light of the detection light, whether the tire is a double tire.

Second Exemplary Embodiment

In this exemplary embodiment, as an aspect of the present disclosure, there will be described a double tire determination device according to a second exemplary embodiment configured such that a part of the configuration of double tire determination device 10 according to the first exemplary embodiment is modified.

The double tire determination device according to the second exemplary embodiment is an example of a configuration in which an axle load measurement unit is added to double tire determination device 10 according to the first exemplary embodiment. The axle load measurement unit detects, from a captured image, a displacement amount of a traveling road caused when a vehicle runs, and calculate an axle load of the vehicle that caused the displacement amount, based on the detected displacement amount.

Hereinafter, with reference to the drawings, the double tire determination device will be described mainly on the differences from double tire determination device 10 according to the first exemplary embodiment.

2-1. Configuration

Figure 9:
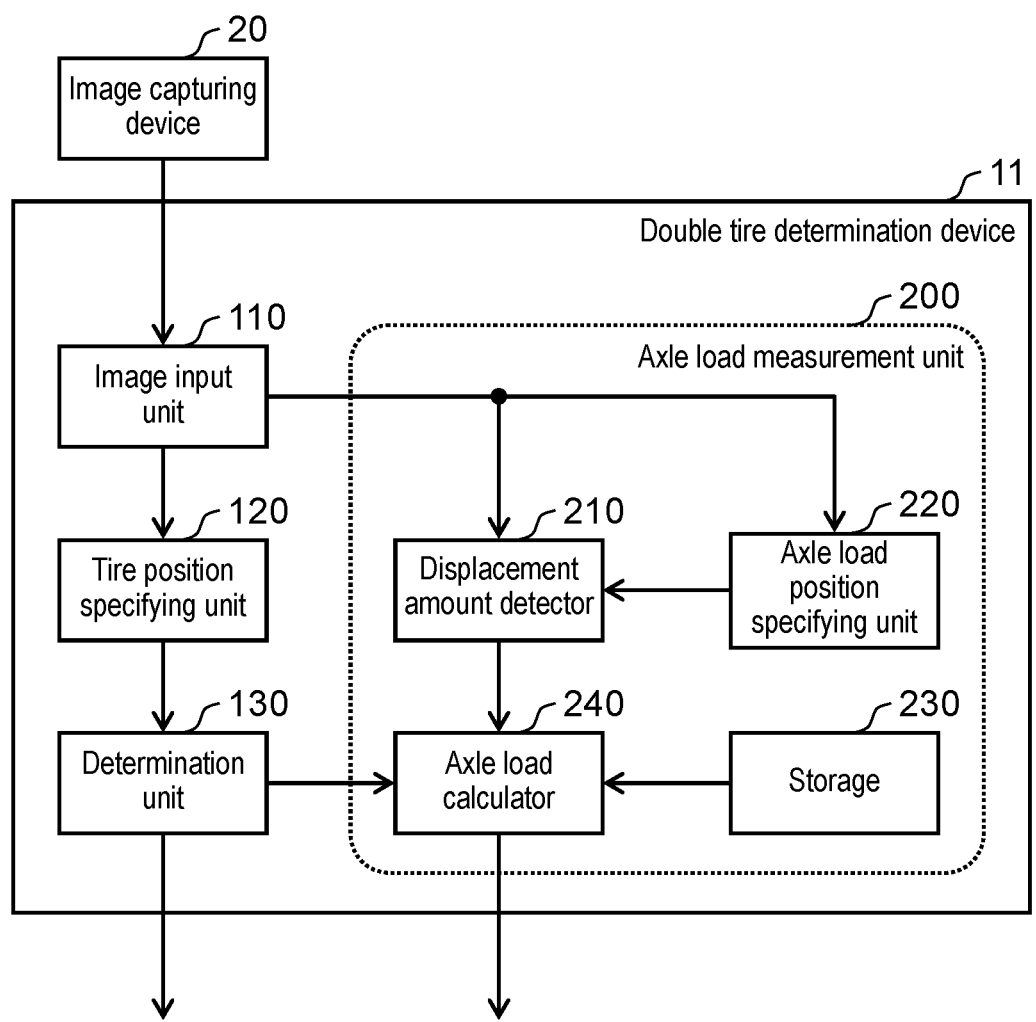
FIG. 9 is a block diagram showing a configuration of a double tire determination device according to a second exemplary embodiment.

FIG. 9 is a block diagram showing a configuration of double tire determination device 11 according to the second exemplary embodiment.

As shown in FIG. 9, double tire determination device 11 according to the second exemplary embodiment is configured such that axle load measurement unit 200 is added to double tire determination device 10 according to the first exemplary embodiment.

Axle load measurement unit 200 is implemented, for example, such that, in a computer (not shown) including a microprocessor (not shown) and a memory (not shown), the microprocessor executes a program stored in the memory.

Axle load measurement unit 200 includes displacement amount detector 210, axle load position specifying unit 220, storage 230, and axle load calculator 240.

When a captured image received by image input unit 110 includes a vehicle on a road, axle load position specifying unit 220 specifies an axle load position of the vehicle in the captured image. More specifically, axle load position specifying unit 220 performs image recognition processing on the captured image to determine whether the captured image includes a vehicle. Then, if it is determined that a vehicle is included, axle load position specifying unit 220 further performs image recognition processing to recognize the tire on the vehicle and to specify a region on the traveling road corresponding to a lowermost point of the tire as the axle load position.

Displacement amount detector 210 detects, by using the captured image in which the traveling road where the vehicle travels is imaged, a displacement amount, in the captured image, of a displacement caused by an applied axle load. In particular, when the axle load position is specified by axle load position specifying unit 220, displacement amount detector 210 detects the displacement amount of the displacement at the specified axle load position. Specifically, displacement amount detector 210 detects the displacement amount of the displacement by comparing a captured image of the traveling road having no displacement and a captured image of the traveling road having a displacement, of a plurality of captured images received by image input unit 110. The detection of the displacement amount of the displacement between the images can be implemented by using block matching, a correlation method, or an optical flow. For example, this displacement amount is calculated as a pixel number indicating a difference in pixel position corresponding to an identical spot on the traveling road between the images to be compared. Further, the captured image in which no displacement is caused may be any of the following images: a previously taken captured image including no object that applies an axle load; a captured image, of a plurality of captured images having been taken temporally continuously, having an amount of image change smaller than or equal to a certain level; and a captured image that is determined, by image recognition processing, not to include any object that applies an axle load.

Storage 230 stores information indicating a relationship between the axle load and the displacement amount. More specifically, storage 230 stores, as information, a relational expression representing a relationship between the axle load and the displacement amount of the displacement in the case where the displacement is caused in traveling road due to the axle load applied to the traveling road and a displacement coefficient, which is a coefficient used in the relational expression. The information is categorized into two types: first information when the tire of a vehicle is a single tire; and second information when the tire of a vehicle is a double tire.

In general, an axle load w (kg) is represented by an expression of w=f(d) as a function f with respect to the displacement amount d (pixel number). In this exemplary embodiment, the function f is approximated by a linear expression. Therefore, storage 230 stores, as the relational expression, a linear expression w=ad, where d is a variable, and α is a coefficient, and stores the coefficient α as a displacement coefficient.

This displacement coefficient α has a displacement coefficient value for each position that can be specified as an axle load position by axle load position specifying unit 220, and the displacement coefficient value is associated with each position. With this configuration, it is possible to reflect on the coefficient α the following difference among regions on the traveling road: the difference in distance from an image capturing position to each region; the difference in composition of material such as asphalt in each region; the difference in road surface temperature in each region; and the difference in deterioration state of the road surface in each region. In this case, for example, for each region (hereinafter, referred to as "local region") of 10 pixels in a horizontal direction (x direction) and 10 pixels in a vertical direction (y direction) in the captured image, the displacement coefficient α has a value corresponding to the local area.

Further, storage 230 stores a coefficient α1 as the first information and a coefficient α2 as the second information. Further, the coefficient α1 as the first information and the coefficient α2 as the second information have a relationship α2=Aα1. A correction coefficient A has a value greater than 1 and smaller than 2, and in this case, the correction coefficient A has a value of 1.5, for example.

Here, the correction coefficient A may be a value determined by, for example, a previously conducted experiment. For example, displacement amount detector 210 may previously detect the displacement amount with respect to an axle having a known axle load in each of two cases: the case where the axle is attached with a double tire; and the axle is attached with a single tire, and a ratio between the displacement amounts may be determined to be the correction coefficient A Examples of the displacement coefficient α1 and the displacement coefficient α2 stored in storage 230 are respectively shown in FIG. 10A and FIG. 10B.

When determination unit 130 determines that the target tire is a double tire, axle load calculator 240 calculates the axle load of the vehicle on the traveling road based on the displacement amount having been output from displacement amount detector 210 and the second information (displacement coefficient α2) stored in storage 230. In particular, when the axle load position is specified by axle load position specifying unit 220, axle load calculator 240 calculates the axle load based on the displacement amount at the specified axle load position. More specifically, axle load calculator 240 calculates the axle load w by multiplying the displacement amount d output from displacement amount detector 210 by the displacement coefficient value corresponding to the region including the axle load position specified by axle load position specifying unit 220.

Further, when determination unit 130 determines that the target tire is a single tire, axle load calculator 240 calculates the axle load of the vehicle on the traveling road based on the displacement amount having been output from displacement amount detector 210 and the first information (displacement coefficient α1) stored in storage 230.

An operation performed by double tire determination device 11 having the above configuration will be described below with reference to the drawings.

2-2. Operation

Double tire determination device 11 performs an axle load measurement process as its characteristic operation.

An axle load measurement process is a process in which, when a captured image including a vehicle is input to double tire determination device 11, the axle load of the vehicle is calculated.

Figure 11:
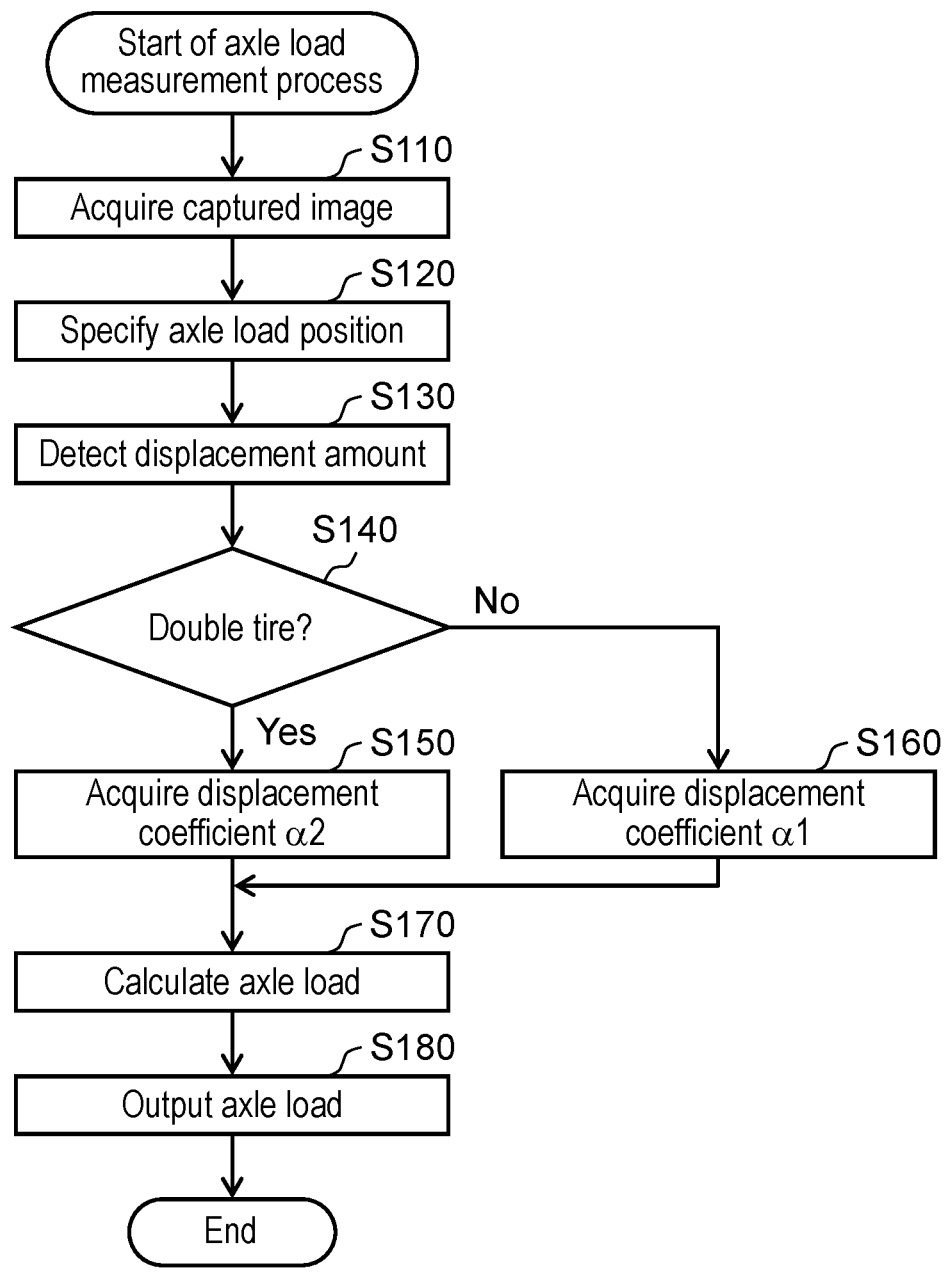
FIG. 11 is a flowchart of an axle load measurement process.

FIG. 11 is a flowchart of the axle load measurement process.

This axle load measurement process is started when a captured image including a vehicle (hereinafter, referred to as "captured image A") is input to image input unit 110.

When the axle load measurement process is started, image input unit 110 acquires the captured image A having been input from image capturing device 20 (step S110).

Figure 12:
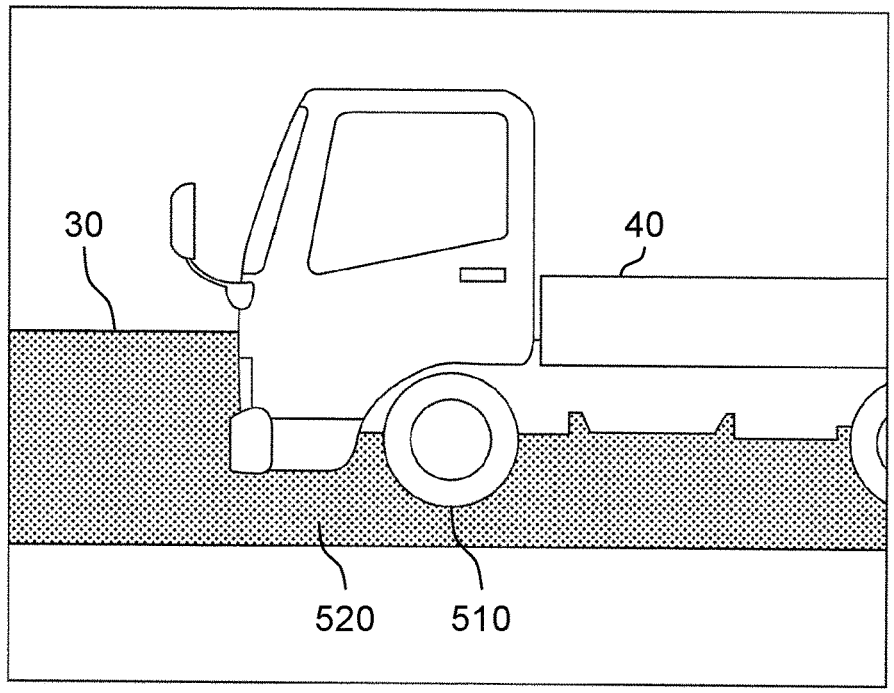
FIG. 12 is a diagram showing an example of captured image A.

FIG. 12 shows an example of acquired captured image A. This captured image A includes vehicle 40 traveling on traveling road 30. Further, this vehicle 40 is in contact with traveling road 30 at lowermost point 510 of a tire of vehicle 40.

With reference to FIG. 11 again, the description of the axle load measurement process will be continued.

When captured image A is input, axle load position specifying unit 220 performs image recognition processing to determine lowermost point 510 of the tire of vehicle 40 and a region on the traveling road 30 corresponding to determined lowermost point 510 is specified as the axle load position (step S120).

In this case, the specified axle load position is not necessarily a single point (one pixel) and may be specified as a local image region constituted by a plurality of pixels. Note that an axle load detection range, which is a target of axle load detection, may be limited to a region on the traveling road 30 or may be a part of traveling road 30. The limited region may be specified by a user or may be specified by using user's specification and using image recognition of colors or textures of the traveling road. Limiting the axle load detection range reduces an image processing throughput. Therefore, a processing throughput for detecting the axle load position can be reduced Note that, when a plurality of tires are in contact with traveling road 30 in the captured image, a plurality of axle load positions are each detected in correspondence with each contact position.

When the axle load position is specified, displacement amount detector 210 detects the displacement amount of the displacement caused in the traveling road at the specified axle load position (step S130). This displacement amount is detected by using captured image A and a captured image which is one of the captured images acquired by image input unit 110 and in which no displacement is caused (hereinafter, this captured image is referred to as "captured image B"). If captured image B is not acquired by image input unit 110 before the axle load position is specified, displacement amount detector 210 detects the displacement amount after waiting until captured image B is acquired by image input unit 110.

Figure 13:
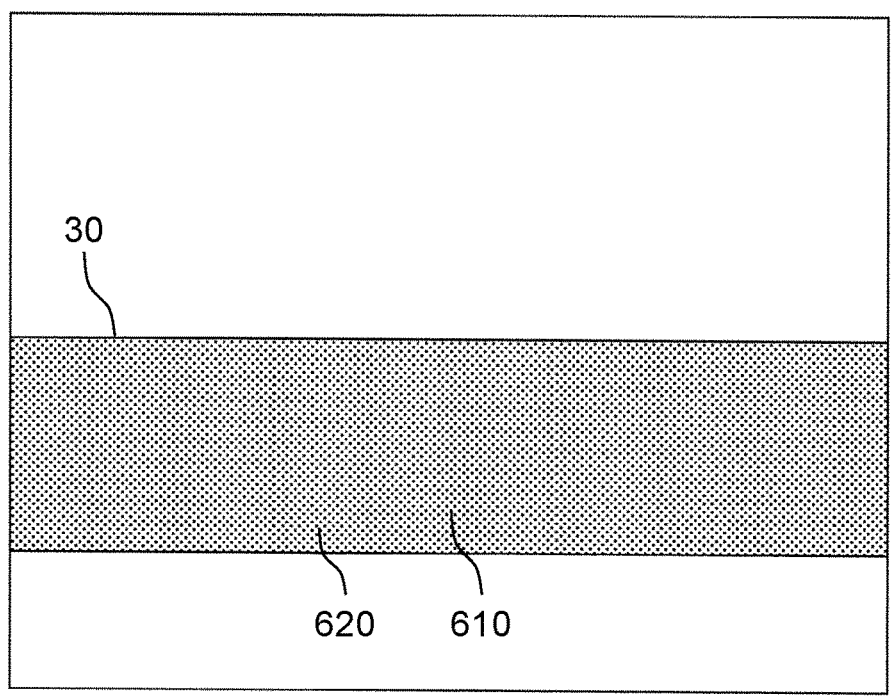
FIG. 13 is a diagram showing an example of captured image B.

FIG. 13 shows an example of acquired captured image B. This captured image B is an image taken of the same place from the same viewpoint as captured image A (see FIG. 12). Region 610 on traveling road 30 in captured image B is the same region as the region on traveling road 30 corresponding to lowermost point 510 of the tire in captured image A. Further, region 620 on traveling road 30 in captured image B is the same region as region 520 on traveling road 30 in captured image A.

Displacement amount detector 210 detects the displacement amount of a displacement caused between the region on traveling road 30 corresponding to lowermost point 510 in captured image A and region 610 in captured image B. Here, because the displacement amount on the traveling road caused by the axle load of an ordinary vehicle is very small, it is desirable to reduce an effect of shake of image capturing device 20 due to vibration or the like of the vehicle traveling on the traveling road. In one example, the same spot that is not specified as the axle load position is selected in each of captured image A and captured image B (for example, region 520 in captured image A and region 620 in captured image B) are selected, and a displacement amount between the selected regions is calculated (hereinafter, this displacement amount is referred to as "non-axle-load-position displacement amount"). Then, this non-axle-load-position displacement is subtracted from the displacement amount of the displacement caused between the region on traveling road 30 corresponding to lowermost point 510 of the tire in captured image A and the region 610 in captured image B so that the displacement amount can be corrected, thereby reducing the effect of shake of image capturing device 20. Besides, the effect of the shake of image capturing device 20 can be also reduced by a method using an optical image stabilization technology, a method using a mechanical mechanism such as a sensor shift method, or the like.

With reference to FIG. 11 again, the description of the first measurement process will be continued.

When the displacement amount is detected, axle load calculator 240 checks whether the target tire is determined to be a double tire by determination unit 130 (step S140).

If, in the process of step S140, the target tire is determined to be a double tire by determination unit 130 (step S140: Yes), axle load calculator 240 acquires the displacement coefficient α2 from storage 230 (step S150).

If, in the process of step S140, the target tire is not determined to be a double tire by determination unit 130 (step S140: No), axle load calculator 240 acquires the displacement coefficient α1 from storage 230 (step S160).

When the displacement coefficient value is acquired in the processes of step S150 and step S160, axle load calculator 240 calculates the axle load by multiplying the acquired displacement coefficient by the displacement amount having been output from displacement amount detector 210 (step S170).

When the axle load is calculated, axle load calculator 240 outputs a numerical value of the calculated axle load to the outside (step S180). Here, instead of outputting the numerical value of the calculated axle load to the outside, axle load calculator 240 may informs, when the numerical value of the calculated axle load is greater than a previously determined reference value, a user of that fact. In this case, the reference value may be an absolute value or may be a relative value. This is done in reflection of the fact that a vehicle included in the corresponding captured image is overloaded with relatively highly probability.

When the process of step S180 is finished, double tire determination device 11 finishes the axle load measurement process.

2-3. Advantageous Effects and the Like

In general, the displacement amount of the displacement caused in a traveling road due to the axle load applied to the traveling road is smaller when the tire attached to the axle is a double tire than when the tire is a single tire.

As described above, in the calculation of an axle load, when the target tire is a double tire, double tire determination device 11 obtains, for the displacement amount detected by displacement amount detector 210, the displacement coefficient α2, which is multiplied by the correction coefficient A. Then, double tire determination device 11 calculates the axle load by using the displacement coefficient α2.

This arrangement enables double tire determination device 11 to measure an axle load more accurately than the conventional axle load measurement device that measures an axle load by a conventional type calculation method in which a displacement amount is not corrected even when a target tire is a double tire.

Other Exemplary Embodiments

As described above, the first and second exemplary embodiments have been described as illustrations of the technique disclosed in the present application. However, the techniques in the present disclosure are not limited to the first and second exemplary embodiments, and are applicable to exemplary embodiments in which changes, replacements, additions, omissions, or the like are made as appropriate.

(1) In the first exemplary embodiment, image capturing device 20 is disposed approximately perpendicularly (about 90°) to the traveling direction on the traveling road, so that a tire can be imaged from an oblique direction when the tire is at a position on the forward side in the traveling direction or the backward side in the traveling direction with respect to the centerline in the captured image. However, image capturing device 20 may be disposed in angular range from 45° to 80° and an angular range from 100° to 135° with respect to the traveling direction of the traveling road. In this case, with the movement of the vehicle imaged in a captured image from the backward side in the traveling direction toward the forward direction in the traveling direction, the ratio between the first wheel region and the second wheel region changes gradually. Based on the degree of this change, it can be determined whether the target tire is a double tire.

(2) In the first exemplary embodiment, the first direction is defined to be the forward direction in the traveling direction of a vehicle, and the second direction is defined to be the backward direction in the traveling direction. However, the first direction may be defined to be an upward direction of the vehicle, and the second direction may be defined as a downward direction of the vehicle. For example, images are taken from a position higher than the tire of the vehicle. Then, when a partial region on the upper side of the wheel is hidden in a blind spot of a tire, the tire is determined to be a double tire, and a part of a region on the upper side of the wheel is not hidden in a blind spot of a tire, the tire is not determined to be a double tire. In this case, it may be determined whether the tire is a double tire, based on the ratio between the area on the upper side and the area on the lower side of the wheel with respect to the rotation center.

(3) In the first exemplary embodiment, double tire determination device 10 has been described as an example of a configuration including image input unit 110 to receive a captured image taken by image capturing device 20. However, double tire determination device 10 does not have to include image input unit 110 if double tire determination device 10 can acquire a captured image. For example, instead of including image input unit 110, double tire determination device 10 may include an imaging unit that takes a captured image. Further, a captured image used by tire position specifying unit 120 may be a captured image taken by the imaging unit. In this configuration, the external image capturing device is not necessary.

(4) In the first exemplary embodiment, double tire determination device 10 has been described as an example of a configuration implemented by a microprocessor executing a program stored in a memory in a computer including the microprocessor and the memory. However, double tire determination device 10 is not necessarily limited to a configuration example implemented exactly in the same way as the above implemented example as long as double tire determination device 10 has a function equivalent to the function of the above implemented example. For example, double tire determination device 10 may be an example of a configuration in which a part of or all of components constituting double tire determination device 10 are implemented by a dedicated circuit.

(5) In each exemplary embodiment, the captured image may be a monochrome image, a color image, or a multispectral image. Further, a wavelength range of light for imaging may be ultraviolet light, near infrared light, or far infrared light, other than visible light.

(6) The components (function blocks) of double tire determination device 10, 11 may be individually integrated into one chip by using a semiconductor device such as an IC (Integrated Circuit) or an LSI (Large Scale Integration). Alternatively, a part of or the whole of the components may be integrated into one chip. Further, the circuit integration is not necessarily implemented by an LSI, and may be implemented by a dedicated circuit or a general-purpose processor. It is also possible to use an FPGA (Field Programmable Gate Array), which can be programed after being fabricated as an LSI, or to use a reconfigurable processor, in which connections or settings of circuit cells in the LSI can be reconfigured. Further, when there emerges a technique for circuit integration that replaces the LSI as a result of development of semiconductor technology or another technology derived from semiconductor technology, the function blocks may be integrated by using such techniques. There can be a possibility that biotechnology can be applied.

Further, all or a part of various processes described above may be implemented by hardware such as an electronic circuit, or may be implemented by using software. Note that processing by software is implemented in such a way that a processor included in the double tire determination device executes a program stored in the memory. Further, the program may be recorded on a recording medium to be distributed or circulated. For example, the distributed program is installed in another device including a processor, and the program is executed by the processor, so that the device can execute the above processes.

In addition, an embodiment implemented by arbitrary combination of the components and the functions of the above-described exemplary embodiments is included in the scope of the present disclosure.

INDUSTRIAL APPLICABILITY

The present disclosure can be widely used for a double tire determination device that determines whether a tire is a double tire.

REFERENCE MARKS IN THE DRAWINGS

10, 11: double tire determination device
110: image input unit
120: tire position specifying unit
130: determination unit
210: displacement amount detector
220: axle load position specifying unit
230: storage
240: axle load calculator

The invention claimed is:

1. A double tire determination device comprising:
an image input unit that receives input of a captured image including a tire mounted on a vehicle and a wheel holding the tire;
a tire position specifying unit that specifies a position of the tire and a rotation center of the tire in the captured image; and a determination unit that determines from the captured image whether the tire is a double tire, wherein:
the wheel in the captured image comprises:
the rotation center of the tire,
a first wheel region that is a part of the wheel located on a. side in a first direction with respect to a vertical line passing through the rotation center of the tire, and
a second wheel region that is a part of the wheel located on a side in a second direction with respect to the vertical line, the second direction being opposite to the first direction, and
the determination unit determines whether the tire is a double tire, based on a ratio between a first area of the first wheel region of the wheel in the captured image and a second. area of the second wheel region of the wheel in the captured image.

2. The double tire determination device according to claim 1, wherein:
the first direction is a traveling direction of the vehicle, in a case where the position specified by the tire position specifying unit is displaced on a side in the first direction with respect to a central position of the captured image by a distance greater than or equal to a. first predetermined length, the determination unit determines whether
the first area is larger than the second area, and
in response to the determination that the first area is larger than the second area, the determination unit determines that the tire is a double tire.

3. The double tire determination device according to claim 1, wherein:
the first direction is a. traveling direction of the vehicle, in a case where the position specified by the tire position specifying unit is displaced on a side in the second direction with respect to a central position of the captured image by a distance greater than or equal to a second predetermined length, the determination unit determines whether the second area is larger than the first area, and
in response to the determination that the second area is larger than the first area, the determination unit determines that the tire is a double tire.

4. The double tire determination device according to claim 1, wherein:
the first direction is a direction of a perpendicular line, from a position of an image capturing device that captures the captured image, to an extended line of a rotation axis of the tire,
the determination unit determines whether the first area is larger than the second area, and
in response to the determination that the first area is larger than the second area, the determination unit determines that the tire is a double tire.

5. The double tire determination device according to claim 1, further comprising:
a displacement amount detector that detects a displacement amount, in the captured image, corresponding to a displacement caused, in a traveling road where the vehicle travels, by an axle load applied by the tire;
a storage that stores information indicating a relationship between the axle load and the displacement amount; and
an axle load calculator that calculates the axle load, based on the displacement amount, the information, and a result of a determination made by the determination unit.

6. The double tire determination device according to claim 5, wherein
the storage stores, as the information, first information for a single tire and second. information for a double tire,
when the determination unit determines that the tire is a double tire, the axle load calculator calculates the axle load, based on the second information and the displacement amount, and
when the determination unit determines that the tire is not a double tire. the axle load calculator calculates the axle load, based on the first information and the displacement amount.

7. A double tire determination method comprising:
receiving input of a captured image including a tire mounted on a vehicle and a wheel holding the tire;
specifying a position of the tire and a rotation center of the tire in the captured image;
determining a first wheel region and a second wheel region in the captured image; wherein the first wheel region is a part of the wheel in the captured image located on a side in a first direction with respect to a vertical line passing through the rotation center of the tire, and the second wheel region is a part of the wheel in the captured image located on a side in a second direction with respect to the vertical line the second direction being opposite to the first direction; and
determining from the captured image whether the tire is a double tire. based on a ratio between a first area of the first wheel region of the wheel in the captured image and a second area of the second wheel region of the wheel in the captured image.

8. The method of claim 7, wherein:
the first direction is a traveling direction of the vehicle, and
the method further comprises:
determining whether the position of the tire is displaced on a side in the first direction or the second direction with respect to a central position of the captured image by a distance greater than or equal to a first predetermined length,
upon determining that the position of the tire is displaced on a side in the first direction, comparing the first area with the second area and determining that the tire is a double tire in response to determination that the first area is larger than the second area, and
upon determining that the position of the tire is displaced on a side in the second direction, comparing the first area with the second area and determining that the tire is a double tire in response to determination that the first area is smaller than the second area.

* * * * *